March 29, 1960     C. SPENCER     2,930,322
HYDRAULIC PUMP, DRIVING MOTOR AND RESERVOIR COMBINATION
Filed Aug. 12, 1957
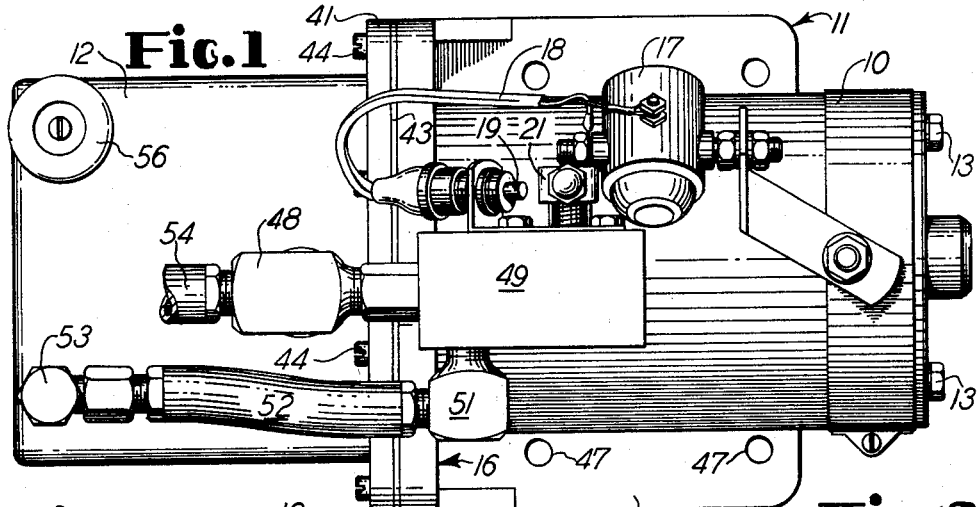
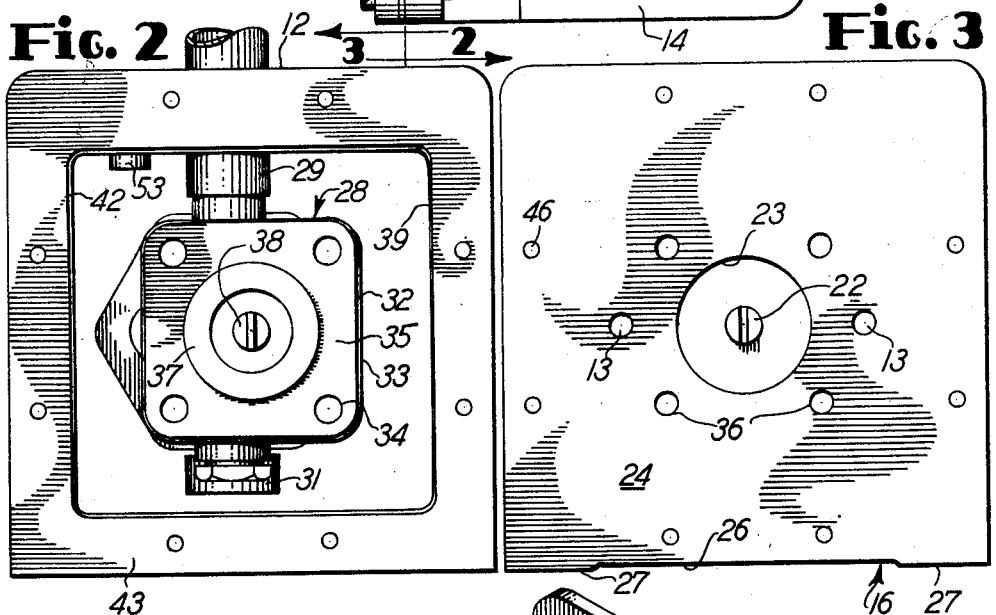
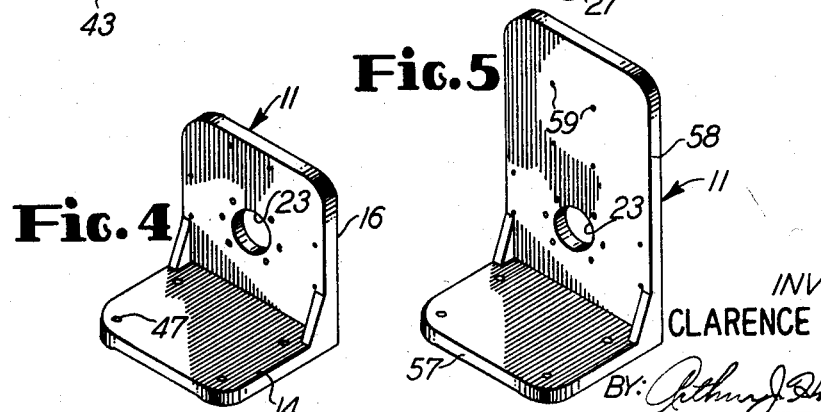
INVENTOR:
CLARENCE SPENCER
BY: *Arthur J. Sonemann*
ATTORNEY

United States Patent Office 2,930,322
Patented Mar. 29, 1960

2,930,322

HYDRAULIC PUMP, DRIVING MOTOR AND RESERVOIR COMBINATION

Clarence Spencer, Racine, Wis.

Application August 12, 1957, Serial No. 677,474

3 Claims. (Cl. 103—43)

This invention relates to a hydraulic pump and driving motor combination, and more particularly it relates to a novel means of assembling the pump and its driving motor and the hydraulic reservoir.

It is an object of this invention to provide a hydraulic pump, a driving motor, and a hydraulic reservoir in one compact unit. In accomplishing this object, the preferred structure, as described hereinafter, includes a mounting bracket or member which also serves as a closure or face plate for the reservoir.

Another object of this invention is to provide the aforementioned pump unit wherein the several parts are readily and easily manufactured and assembled with the end result that substantially less time is required in the assembly of the unit, as compared to the time heretofore required in assembling units containing the various components.

Still another object of this invention is to provide the afore-mentioned unit wherein the conduits containing the hydraulic fluid are simpler and fewer in number, as compared to the conduits of the heretofore known pump and motor combinations.

Still another object of this invention is to provide the afore-mentioned unit with means whereby the unit can be readily and easily mounted in any position, including an inverted position, with the only requirement being that the hydraulic fittings or conduits be somewhat changed.

Still another object of this invention is to provide the afore-mentioned unit with the unit having a so-called built-in means for receiving and supporting control instruments such as valves and electrical switches.

Other objects and advantages will become apparent upon reading the following description in conjunction with the accompanying drawings, wherein:

Fig. 1 is a top plan view of a preferred embodiment of this invention, and with parts broken away.

Fig. 2 is an end elevational view showing the interior of the unit of Fig. 1, as viewed along the line designated 2 of Fig. 1, and with parts broken away and parts removed.

Fig. 3 is an end elevational view of the interior shown in Fig. 1 taken along the line designated 3 of Fig. 1, and with parts removed.

Fig. 4 is a reduced perspective view of the mounting member shown in Figs. 1 and 3.

Fig. 5 is a reduced perspective view of a modification of the mounting member shown in Figs. 1 and 3.

The same reference numerals refer to similar parts throughout the several views.

Fig. 1 generally shows a conventional type of electrical motor 10 supported on a mounting member generally designated 11, and a cubically shaped hydraulic reservoir 12 is shown to be oppositely disposed with respect to the motor 10. Long mounting bolts 13 extend through the housing of the motor 10 and are shown in Fig. 3 to extend to the plane of the line designated 3, as indicated in Fig. 1. Thus, it should be understood that the mounting member or bracket 11 is L-shaped and includes a first planular section 14 and a second planular section 16 with the two sections shown to be at right angles to each other. The motor mounting bolts 13 thus extend into the section 16 of the member 11. The motor 10 also has the usual condenser 17, the electrical connection 18, the electrical switch 19, and the switch lever 21, all positioned above the motor, as viewed in Fig. 1. Fig. 3 shows the motor drive shaft and coupler 22 extending into and concentric with respect to a circular opening 23 in the section 16. While still referring to Fig. 3, it should be noted that the section 16 has a planular face 24, which face is perfectly straight and flat for a purpose mentioned later. Also, the underneath surface of the first planular section 14 has a relief, indicated 26, along the length thereof to present two feet 27 on opposite sides of the section 14.

Fig. 2 shows an interior view of the reservoir 12 which is, of course, entirely enclosed except for the near side, as viewed in Fig. 2. A conventional type of hydraulic pump 28 is suspended within the reservoir 12 by means of a hydraulic pipe 29 extending through the top wall of the reservoir and attaching at its lower end to the pump 28. The bottom of the pump also has a nipple 31 which projects down into what would be the sump of the reservoir when the latter is supplied with hydraulic fluid, such as the usual oil. It will also be noticed that the pump 28 has a face plate 32 which, in the normal assembly, as in the Fig. 1 condition, is disposed parallel to the face 24 of the member 11. A gasket 35 is disposed between the faces 24 and 32. Also, the pump has a flange 33 which contains the four shown bolt holes 34 through which conventional bolts can pass and thread into the registering holes 36 in the section 16. Another element of attaching the pump 28 in the assembly being described is that the pump includes a circular boss 37 which snugly fits into the circular opening 23 to pilot and align the pump with respect to the member 11, and thus the pump shaft and coupler 38 can mate in a rotationally driving relation with the motor shaft and coupler 22. Of course, the operation of the electrical motor 10 will, therefore, rotate its shaft 22, which is in driving relation with the pump shaft 38, and by this means, the pump 28 is driven.

In this manner, the pump 28 is disposed within the transversely projected area of the section 16, and the pump is, of course, disposed within the cubical opening 39 of the reservoir 12. The reservoir also includes the endless flange 41 which encircles the end of the reservoir adjacent the motor 10, and the flange 41 has an endless planular and flat face 42 which is disposed parallel to the face 24 of the member 11. A fluid sealing gasket 43 is disposed between the faces 24 and 42, and a plurality of bolts 44 are spaced around the flange 41 and extend therethrough into the tapped holes 46 in the member 16 to thereby fluid tightly mount the reservoir 12 on the member 16.

It should now be understood that the essence of this invention is the provision of the member 11 having a first section 14 and a second section 16 with the latter providing the support and mounting for the motor 10 on one side thereof and providing the support, mounting, and fluid tight enclosure for the reservoir 12 on the opposite side of the section 16. In this arrangement, the parts mentioned are all assembled as one unit and are all sturdily mounted and supported through the single member 11 which is provided with means or openings 47 through which mounting bolts can pass to have the entire assembly rigidly mounted on a horizontal, vertical, or any angularly disposed surface. The usual requirement of remote location of the reservoir of a hydraulic unit is not required in the herein described unit since the reservoir is mounted directly onto, and as a part of, the unit and, further, there is no requirement for bolting the reservoir to a separate support since the reservoir is firmly mounted on the mounting member 11 and is thereby fully supported.

To complete the description of the hydraulic conduit, as shown in Figs. 1 and 2, it will be seen that a T-connector 48 attaches to the upper end of the conduit 29 to extend into a valve 49 which has an outlet connector 51 which, in turn, has a conduit hose 52 shown extending to a connector 53 projecting through the top wall of the reservoir 12 to communicate with the interior thereof and serve as a return for the hydraulic fluid. Another hydraulic conduit 54 extends in the opposite direction from the T-connector 48, and it should be understood that the conduit 54 would connect to a hydraulic cylinder or like hydraulic motor in a conventional manner. Thus, actuation of the valve 21 will energize the motor shaft to drive the pump 28 and cause the fluid to be conducted to the conduit 54 or to be bypassed through the hose 52 and back into the reservoir, all as required. Also, an air breather and filler cap 56 extends through the top of the reservoir 12 in a conventional arrangement.

Fig. 5 shows a modification of the mounting member 11, and it will be noted that the base portion 57 is identical to the portion 14 of the Fig. 1 embodiment of the member 11. However, the portion 58 of the alteration is not identical to the portion 16 of Fig. 1. In Fig. 5, the member 58 does contain the described opening 23 and the bolt holes as shown, but the section 58 is lengthened to extend upwardly a greater distance than that shown in Fig. 4 so that the additional height of the member 58 can be provided with mounting holes or means 59 which receive bolts and the like for securing miscellaneous valves and switches, such as those shown in Fig. 1, for the operation of the hydraulic unit. This is particularly useful in the alternating current type of motor 10 in that the elongated or extended portion 58 serves as an instrument panel and, therefore, the usual separate and remotely positioned panel is not required. Thus, in the Fig. 5 embodiment, the entire power unit is assembled together on the mounting member 11 and, in addition, the section 58 would serve as an instrument panel to which the valves and switches can be attached in a location convenient to the remainder of the hydraulic unit.

Although specific structures of this invention have been shown and described, it should be understood that certain changes could be made in the structures and, therefore, the scope of this invention should be limited only by the scope of the appended claims.

What is claimed is:

1. In a hydraulic pump of the type powered by a motor and having a hydraulic fluid reservoir, the combination of a motor including a drive shaft, an L-shaped member having a first planular section and a second planular section with the two sections angularly disposed with respect to each other and with said second planular section having a circular opening therethrough, said motor being attached to one side of said second planular section with said drive shaft concentric with said circular opening, a hydraulic pump mounted on the other side of said second planular section and including a circular boss piloted in said circular opening and with said pump disposed within the transversely projected area of said second planular section and drivingly connected to said drive shaft of said motor, said pump being fluid tight with said other side to seal off said opening, said pump and said motor being bolted together with the intervening said second planular section, an open-end hydraulic reservoir including an endless flange fluid tightly mounted on said other side of said second planular section with the open end thereof contiguous and fluid tight with said other side of said second planular section and with said reservoir enclosing said pump, and hydraulic conduits connected to said pump and said reservoir and extending through the latter.

2. In a hydraulic pump of the type powered by a motor and having a hydraulic fluid reservoir, the combination of a motor including a drive shaft, an L-shaped member having a first planular section and a second planular section with the two sections angularly disposed with respect to each other and with said second planular section having a circular opening therethrough, said motor being bolted to one side of said second planular section with said drive shaft concentric with said circular opening, a hydraulic pump bolted to the other side of said second planular section and including a circular boss piloted in said circular opening and with said pump disposed within the transversely projected area of said second planular section and drivingly connected to said drive shaft of said motor, said pump including a planular face encircling said boss and being fluid tight with said other side completely around said opening, an open-end hydraulic reservoir including a planular and endless external flange surrounding the open end and with said flange fluid tightly bolted on said other side of said second planular section and with said reservoir enclosing said pump, hydraulic conduits connected to said pump and said reservoir and extending through the latter, and said first planular section having bolt holes for fixedly mounting said member with all aforementioned parts as one unit.

3. In a hydraulic pump of the type powered by a motor and having a hydraulic fluid reservoir, the combination of a motor including a drive shaft and a housing, a mounting member having a plurality of bolt holes circularly disposed and including a section having a first planular face and a second planular face with said second planular face having a circular opening therein concentric with said bolt holes, said motor being attached to said first planular face with said housing being bolted through some of said bolt holes directly to said first planular face to be in abutment therewith and to dispose said drive shaft concentric with said circular opening, a hydraulic pump mounted on said second planular face and including a housing and a shaft and a circular boss with the latter being snugly fitted in said circular opening and having a gasket therearound and said housing being bolted directly through other of said bolt holes to said second planular face to be in fluid-tight abutment therewith and with said shaft of said pump being co-axial with and drivingly connected to said shaft of said motor, an open end hydraulic reservoir including an endless flange with a gasket thereover and being fluid-tightly bolted directly to said second planular face and with said reservoir enclosing said pump, and hydraulic conduits connected to said pump and said reservoir and extending through the latter.

References Cited in the file of this patent
UNITED STATES PATENTS

| Re. 19,961 | Crane | May 12, 1936 |
| 1,722,284 | Fisher | July 30, 1929 |
| 2,057,381 | Kennedy | Oct. 13, 1936 |
| 2,285,710 | Harlow | June 9, 1945 |
| 2,410,808 | Christensen | Nov. 12, 1946 |
| 2,464,936 | McConaghy | Mar. 22, 1949 |
| 2,478,829 | Lechtenberg | Aug. 9, 1949 |